Nov. 28, 1961 R. ADELL 3,010,759
ORNAMENTAL AND EDGE PROTECTIVE MOLDING FOR AUTOMOBILE DOORS
Filed Oct. 23, 1959
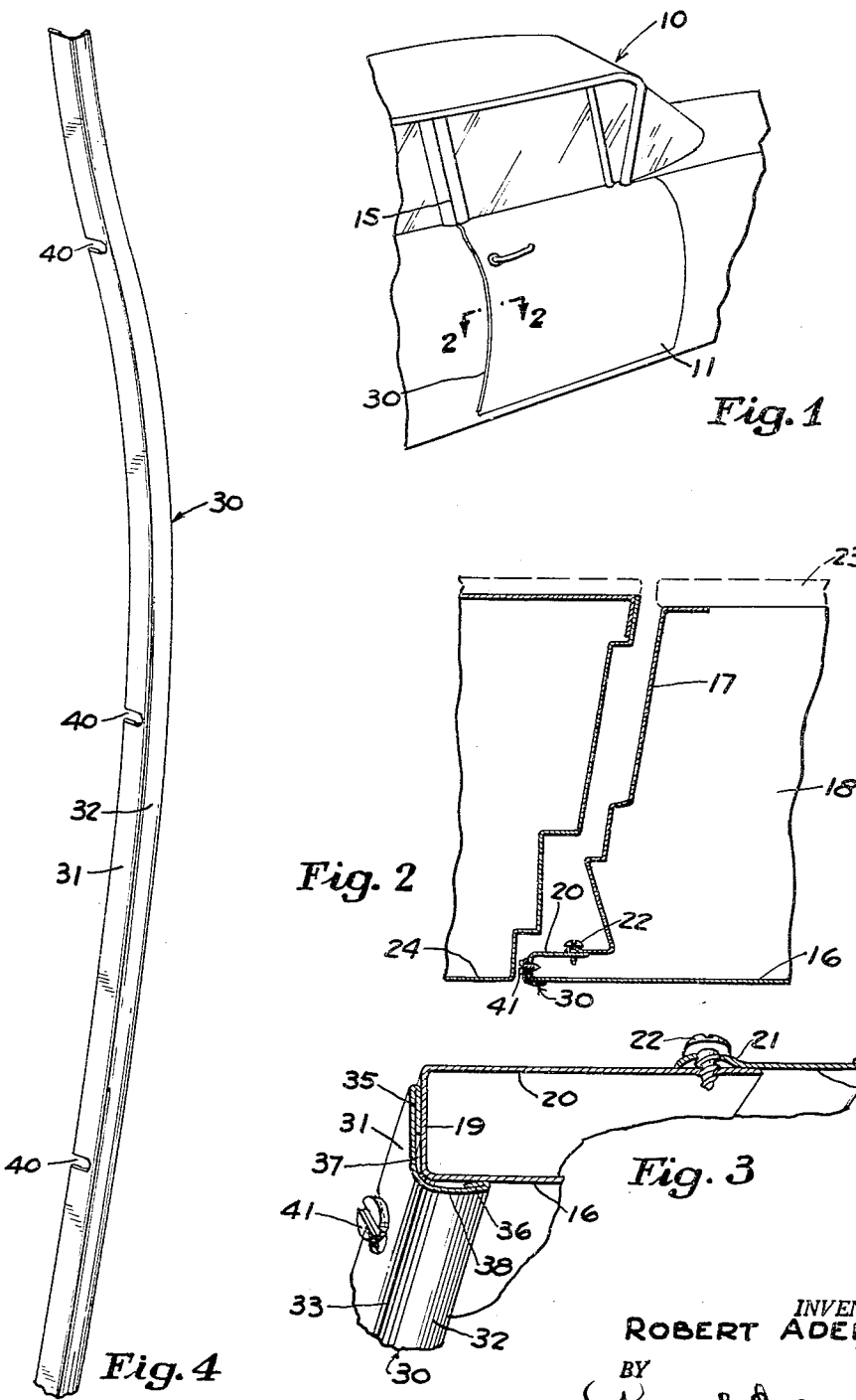
INVENTOR.
ROBERT ADELL
BY
ATTORNEY

United States Patent Office 3,010,759
Patented Nov. 28, 1961

3,010,759
ORNAMENTAL AND EDGE PROTECTIVE MOLDING FOR AUTOMOBILE DOORS
Robert Adell, Detroit, Mich., assignor to Franklin Z. Adell and Marvin M. Adell, both of Detroit, Mich.
Filed Oct. 23, 1959, Ser. No. 848,414
1 Claim. (Cl. 296—44)

This invention relates to motor vehicles and more particularly to an improved ornamental and protective molding for the swinging edge of the doors thereof.

It has now been recognized that provision of ornamental and protective molding on the trailing edge of doors is an expedient of high utility. However, securing such molding to door edges presents serious difficulties to the solution of which much of the inventive effort of those skilled in the art has been directed within the last several years.

Trailing edges of automobile doors are usually in the form of a relatively thin protruding flange of considerable width, usually referred to as "lip edge," permitting provision of U-shaped molding resiliently embracing such door edge. However, with the advent of door edges of right angle cross section, provision of ornamental molding presented incomparably greater difficulties, since such molding cannot be of a U-shape cross section or embrace the door edge resiliently. It should be understood in this connection that retaining such ornamental and protective molding in place is exceedingly difficult, partly because such molding is usually very narrow, being in some cases only ¼" wide, and partly due to severe operating conditions including road rumble and hard slamming of automobile doors.

The advent of automobile doors having a separable outer skin sheet made the above problem still more difficult. An automobile door through the years of its development has now stabilized its construction in the form of a relatively flat outer skin sheet connected to an inner sheet having deep flanges to provide an enclosure housing window operating mechanisms and door locks. Provision of the removable outer skin sheet proved to be an exceedingly important improvement for the automobile industry. Removal of the outer skin sheet exposes the inner mechanisms housed within the door, for service and repair, without removal of the inner door panels as well as various operating handles and knobs protruding therethrough.

In the constructions making outer skin sheet removable, such sheet still remains relatively flat with only very narrow flanges. As a result, relatively small manufacturing variations and warpage of the sheet due to various causes enhance the above problems still further. It should be understood in this connection that a molding of U or L shaped cross section made of sheet material, such as stainless steel, cannot be bent longitudinally to any appreciable degree in the process of its application to a door edge but must be formed in special dies or bending machines, substantially to the longitudinal curvature of the door edge. The longitudinal curvature so imparted to a molding can be changed only very little in the process of application, and such change may not be sufficient to compensate for the variations in the longitudinal curvature of door edges as the same may be encountered in practice.

One of the objects of the present invention is to provide an improved ornamental and edge protective molding whereby the above difficulties and disadvantages are overcome and largely eliminated without introducing new problems or substantially increasing the costs involved.

Another object of the present invention is to provide an ornamental and edge protective molding of L-shaped cross section, which molding can be secured in place in a reliable manner, and the construction of which provides compensating means for variations in the longitudinal curvature of door edges as encountered in actual practice.

A further object of the present invention is to provide an improved molding of the above nature, which is simple and rugged in construction, dependable in use, is easy to apply to an automobile door, and is relatively inexpensive to manufacture and is easy to replace.

Further objects and advantages of this invention will be apparent from the following description and appended claim, reference being had to the accompanying drawings forming a part of this specification, wherein like reference characters designate corresponding parts in the several views.

FIG. 1 is a perspective view showing a portion of an automobile including a door provided with an ornamental and edge protective molding embodying the present invention.

FIG. 2 is a sectional view on an enlarged scale taken in the direction of the arrows on the section plane passing through the line 2—2 of FIG. 1.

FIG. 3 is a fragmentary perspective view taken on the section shown in FIG. 2.

FIG. 4 is a perspective view showing the ornamental and edge protective molding separately, i.e. removed from the door edge.

It is to be understood that the invention is not limited in its application to the details of construction and arrangement of parts illustrated in the accompanying drawings, since the invention is capable of other embodiments and of being practiced or carried out in various ways. Also, it is to be understood that the phraseology and terminology employed herein is for the purpose of description and not of limitation.

In the drawing there is shown, by way of example, an improved ornamental and edge protective molding embodying the present invention. Referring to FIG. 1, the same shows a portion of an automobile 10 including a door 11 hinged at its front end, therefore, providing a swinging or trailing edge 15. The door 11 is of a construction including a removable skin sheet 16 and an inner sheet 17, providing between them a hollow 18 adapted to house window operating mechanisms, locks and the like. The skin sheet 16 is provided with an inwardly directed flange 19 which, in turn, is bent at a right angle, i.e. parallel to the skin sheet 16, to provide the flange 20. The inner sheet 17 is provided with a raised bead 21 overlying the edge of the flange 20 and connected thereto in any suitable manner, such as with the aid of self-tapping screws 22. Provision of the bead 21 ensures a resiliently tight connection between the sheets 16 and 17.

The inside door panel, such as indicated at 23, is provided on the inside of the door. The door is adapted to close against the door post or an adjacent portion of the automobile body, such as designated at 24, in a manner well known in the art.

An ornamental and edge protective molding generally designated by the numeral 30 is provided along the lower portion of the trailing edge of the door formed by the rear portion of the sheet 16 and flanges 19 and 20. The molding comprises a strip of sheet material, such as stainless steel, bent to a substantially L-shaped cross section and formed longitudinally in special dies or bending machines to a longitudinal curvature substantially corresponding to that of the door edge, as is best shown in FIG. 1. By virtue of such a construction the molding comprises an inner leg 31 and an outer leg 32 connected together by a rounded portion 33. The edges of the legs 31 and 32 are bent upon themselves as shown at 35 and 36 to form smooth and rounded edges. The leg 32 may be curved to provide a more pleasing appearance and stronger construction as is indicated at 38. On the other hand, the leg 31 may be made straight. Because of such a construction, there is thus provided some clearance space as indicated at 37 between the molding and the door edge in order to provide a certain amount of resiliency in the connection of the molding to the door edge and thus to ensure tightness.

The inner leg 31 is provided with a plurality of slots 40 extending transversely of the molding from the edge of the leg 31 toward the connecting portion 33 but terminating before reaching the same. The width of the slots 40 is so selected as to pass with some clearance the stems of the connecting screws 41, but to have the heads thereof overlie and extend over the leg 31 on both sides of the respective slots 40 in order to hold said leg against the flange 19 and thus to retain it in place.

The angle between the legs 31 and 32 may be made somewhat less than 90° in order that as the screws 40 are tightened, the molding slightly unbends opening its angle between the legs of the L and thus produces a resiliently tight connection of the molding to the door edge.

By the provision of the slots 40 receiving the stems of the screws 41 with some clearance and also facilitating bending of the molding with slight opening or closing of said slots, the longitudinal curvature of my improved molding may be slightly changed or adjusted in the process of application of the molding in order to compensate for manufacturing variations or warpage which are inevitable in actual practice. By virtue of such an advantage, fitting the molding to the door edge is made more precise in spite of such variations, and the molding is retained in place in a more reliable manner and presents a better appearance.

It will now be understood in view of the foregoing that the slots 40 do not affect the appearance of my molding when the same is installed in place since no interruption of the molding is apparent when the door is closed. It should also be appreciated that the slots 40 perform the double function of receiving the stems of the connecting screws and also enabling bending of the molding for compensating for variations in the curvature of the door edge, which would not be possible or practicable if the inner leg 31 had round holes, rather than slots, for passage of the stems of connecting screws 41.

By virtue of the above disclosed construction, objects of the invention listed above and numerous additional advantages are attained.

I claim:

In a motor vehicle having a door with a hinged side and a swinging side, an outwardly removable skin sheet on said door having its portion on the swinging side of the door bent to provide a trailing edge of a hollow rectangular cross section, an edge protective and ornamental molding provided along at least a portion of said trailing door edge and having longitudinal curvature substantially corresponding to that of said portion, said molding being made of sheet metal and having an inner leg and an outer leg to form a substantially L-shaped cross section, said inner leg having provided therein a plurality of transverse slots extending from the edge of said inner leg toward the place of juncture thereof with the outer leg but terminating short of reaching said place of juncture, said slots having width sufficient to pass the stems of screws connecting the molding to said skin sheet but to have the heads of said screws extend over the inner leg on both sides of the respective slots, said slots also adapting the molding to adjust its longitudinal curvature in the process of installation to that of the door edge as may be affected by manufacturing variations, said molding being removable from the door together with said skin sheet and without separation from said sheet.

References Cited in the file of this patent

UNITED STATES PATENTS

| 2,346,630 | Wagner | Apr. 11, 1944 |
| 2,489,072 | Ausubel | Nov. 22, 1949 |
| 2,797,130 | Renno | June 25, 1957 |
| 2,879,104 | Halladay | Mar. 24, 1959 |
| 2,887,338 | Adell | May 19, 1959 |

FOREIGN PATENTS

| 1,033,885 | Germany | July 10, 1958 |